United States Patent Office 2,784,370
Patented Mar. 5, 1957

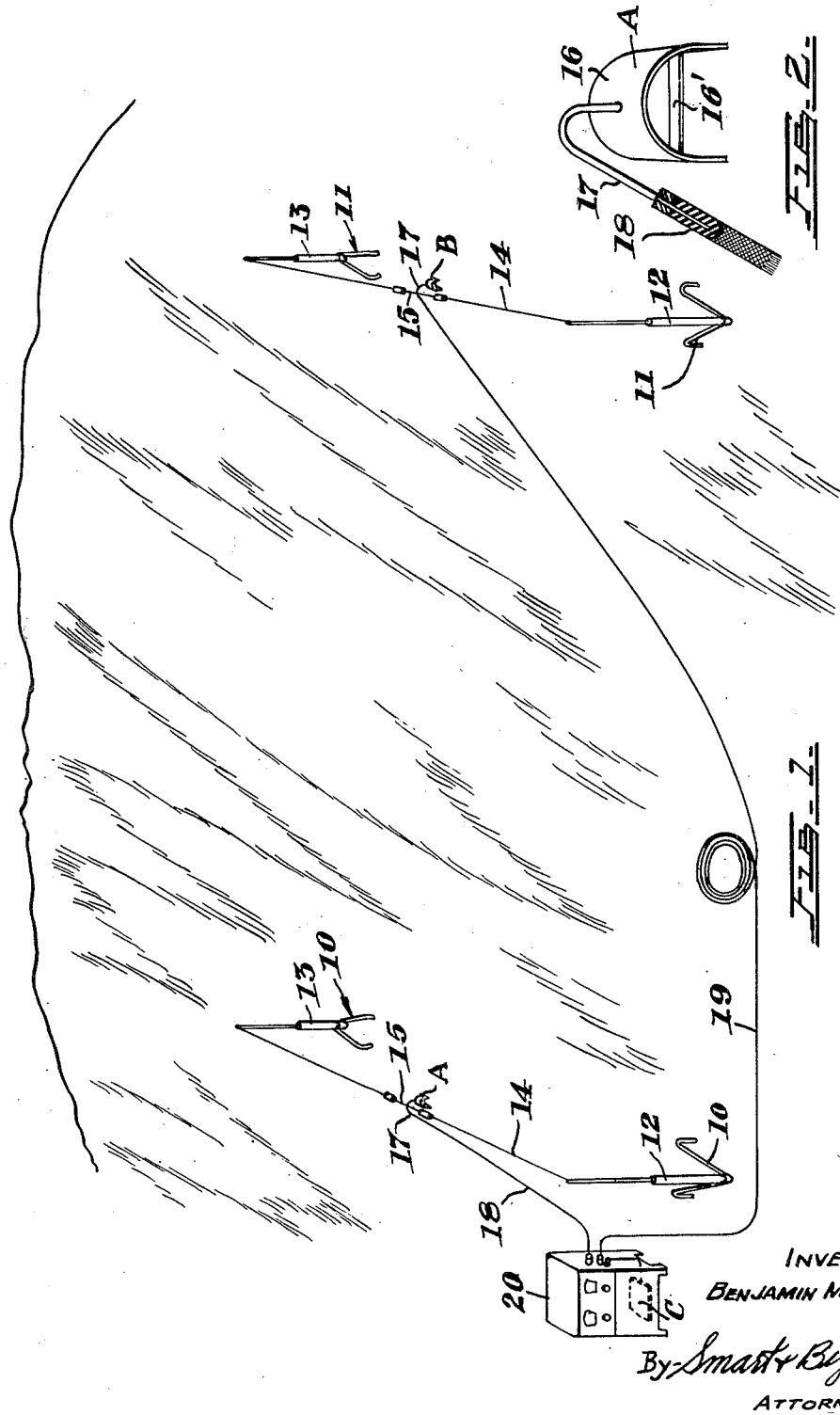

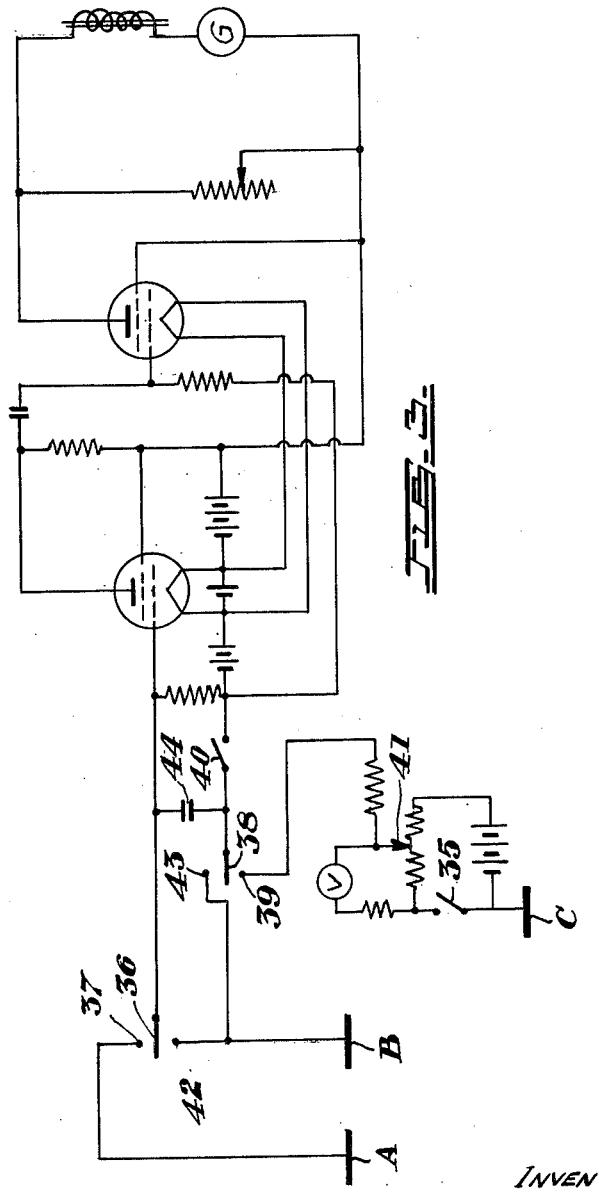

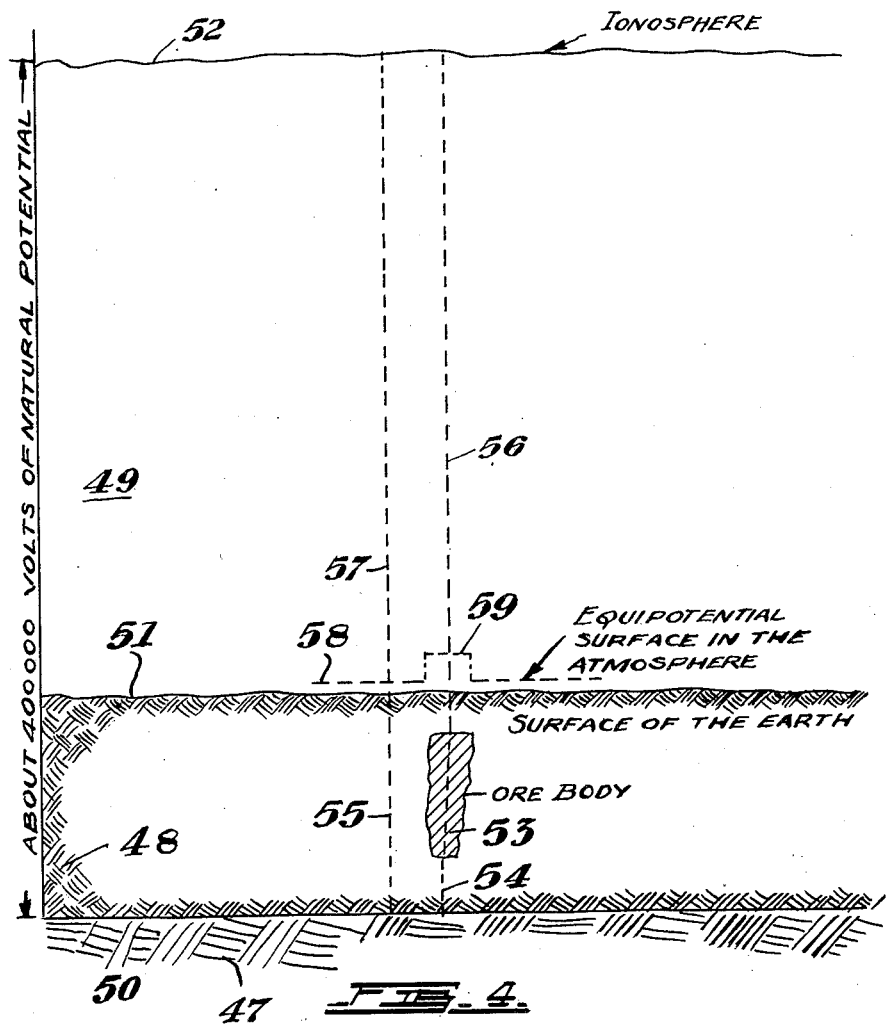

2,784,370

GEOPHYSICAL PROSPECTING

Benjamin Morrison, Flin Flon, Manitoba, Canada, assignor to Hudson Bay Mining and Smelting Co. Limited, Winnipeg, Manitoba, Canada, a corporation of Canada Application December 19, 1952, Serial No. 326,893

14 Claims. (Cl. 324—4)

This invention relates to the art of prospecting for anomalies, such as ore bodies, within the earth's crust.

Several electrical methods of prospecting have been developed, but all suffer from various disadvantages. The magnetometer which is useful when prospecting for certain iron and nickel ores which cause magnetic anomalies in the earth's magnetic field, is not suitable when prospecting for certain copper, zinc and iron sulfides which do not exhibit pronounced magnetic anomalies in the earth's magnetic field. The induced current methods which are designed to detect abnormal electrical conductors, such as many sulfide ore bodies, are subject to being too cumbersome, or else too limited in range. The limit of depth for the "Loop-Frame" type of induced current equipment which is conveniently portable, is of the order of 200 feet. Moreover, over lake ice this equipment is not satisfactory since indications of anomalies are obtained over reefs, as well as when the shore is approached, and these indications cannot be distinguished from indications of anomalies such as ore bodies within the earth's crust. Another method depending upon measuring the self-electrical potential of a galvanic nature present with certain types of ore bodies is of limited application. It is not satisfactory for sulfide ore bodies having little or no upper oxidized portion essential to this galvanic action, as is usually the case in the pre-Cambrian rock of Canada.

The present invention is based upon the measurement of electrical potential at or near the surface of the earth. This electrical potential has been known to exist in the earth's atmosphere and has been measured previously as evidence of the existence of the phenomenon commonly referred to as atmospheric electricity. Previous workers in this field have assumed that atmospheric electricity occurs only in the atmosphere present between the outer surface of the earth's crust and the ionosphere. The measurements made by the present inventor indicate that this electricity exists beneath the outer surface of the earth's crust and have led him to believe that the total electrical potential caused by what has been called atmospheric electricity exists between the ionosphere and some conducting shell at a considerable depth in the earth.

In describing and claiming the present invention the term "terrestrial electricity" will be used to designate the electricity existing in the atmosphere and in at least the upper part of the earth's crust.

It has been observed by the present inventor that whereas the potential caused by terrestrial electricity at two laterally separated points in an area to be prospected is normally the same, yet if one of these points is over an anomaly such as an ore body and the other is not, the terrestrial potential at the point over the ore body is lower than that over the other point. The two laterally separated points may be on the ground or underground or at the same elevation above the ground. The present invention is based on this observation.

According to the invention, therefore, there is provided a method of geophysical prospecting which comprises essentially the steps of arranging at least two electrodes at laterally spaced points in an area to be prospected and comparing the potentials resulting from terrestrial electricity occurring at a given time at these electrodes. Normally one of the electrodes is kept stationary and another is arranged successively at each of a number of points in the area to be prospected, the comparison of potentials referred to being made each time the latter electrode is moved to a new point. The two electrodes may be arranged in the atmosphere at the same elevation above the ground (which term in this specification is intended to include the surface of any body of water), in which case a record will be kept of the differences between their potentials at each comparison. In the case of the electrodes being arranged in the atmosphere above the ground, the height of one of them above the ground may be adjusted at each comparison until the potential at it becomes the same as the potential at the other, in which case a record is kept of the adjustments of height of the adjustable electrode.

In snow covered areas geophysical prospecting in accordance with the invention may be carried out by arranging at least two electrodes at horizontally spaced apart points in dry snow and obtaining an indication of the potentials resulting from the accumulation of electrically charged atmospheric particles in the snow present at a given time at the electrodes. The electrodes may be placed in contact with other mediums than the atmosphere and snow. It has been found that among surface formations of rock the rock itself may be used as a medium, and that in wooded areas blazes on living trees may be used.

It will be clear that the invention may be practised in a variety of ways with a variety of apparatus, but it will be described in more detail with reference to one form of apparatus whichh as been found suitable and is illustrated in the attached drawings, in which—

Figure 1 is a schematic illustration of the apparatus;

Figure 2 is a detail of the electrodes used in the apparatus of Figure 1;

Figure 3 is a diagram of the circuit used in the apparatus of Figure 1, and

Figure 4 is a diagram to illustrate the apparent theoretical basis of the observations on which the invention is based.

In the apparatus shown in Figure 1, the electrodes A and B are supported in the air above the ground on stands 10 and 11. Each stand is composed of a pair of telescopic uprights 12 and 13 and a crosspiece 14, of which the mid-section 15 is insulated from the remainder. Each electrode, as shown best in Figure 2 with reference to the electrode A, is a downwardly extending U-shaped copper sheet 16 having between its arms a metal ribbon 16' which is made radioactive by having radium D-impregnated gold foil incorporated in it. Each electrode 16 is mounted on the end of a conducting hook 17, and electrical connection is made to the other end of the hook 17 through an insulated and shielded cable. The strip 16' of radioactive gold emits alpha particles, with the result that the electrode 16 more quickly reaches the potential of its surrounding atmosphere. From the electrode A insulated cable 18 and from the electrode B insulated cable 19 lead to a portable container 20 containing the electrical equipment for enabling comparison of the potentials at the two electrodes. A counterpoise electrode C is arranged at the bottom of the container 20 so as to be close to but out of contact with the ground. This electrode, which is also equipped with a source of radioactivity, may be 2–4 inches from the ground but should be out of contact with snow in winter operations, and the electrodes A and B may be at heights of about 30 inches.

The circuit of the electrical equipment in the container 20 in which the electrodes A, B or C are connected is shown in Figure 3. It is a conventional ballistic slide-back voltmeter circuit containing a galvanometer G and a voltmeter V.

With this apparatus the geophysical prospecting of an area is carried out as follows: The container 20 is set down at or near the area to be prospected and the stands 10 are set up so that the electrode A is supported at a higher level than the electrode C. The location of the electrode A then becomes the reference point of the survey. The stands 11 are set up so that the electrode B is suspended over a point within the area to be prospected.

The switch 35 (Figure 3) is now closed, the switch 36 is closed on the contact 37, and the switch 38 on the contact 39, the switch 40 being open. The rheostat 41 is then adjusted until a setting is reached which results in little or no deflection of the galvanometer G upon closing the switch 40. The potential of the electrode A with respect to the electrode C is then read on the voltmeter V. This having been done, the switch 36 is then closed on contact 42 and the potential of the electrode B with respect to C read on the voltmeter V. The electrode B may be kept at the same height as the electrode A and any difference between the potentials of the two electrodes noted, or the height of the electrode B may be adjusted through the telescopic uprights 12 and 13 until the potential of the electrode B appears on the voltmeter to be the same as the potential of the electrode A. The equality of the potentials may be checked by closing the switch 38 on the contact 43 and the switch 36 on the contact 37, thus connecting the electrodes A and B across the condenser 44. It can then be observed, upon closing the switch 40, whether there is any deflection of the galvanometer G. If there is, further adjustment of the height of the electrode B can be made until a zero deflection is obtained. It is thus possible to make the comparison of potential between A and B electrodes directly without reference to a C electrode, but the method using the C electrode embodies a cross-check.

Owing to the fact that terrestrial potential may vary appreciably with the passage of time, the potentials of the electrodes A and B with respect to the third electrode C should be ascertained substantially simultaneously since otherwise any difference between them which is observed may be the result of changes in terrestrial potential between the time when one observation is made and the time when the other is made.

If the electrodes A and C are not over an ore body but the electrode B is over an ore body, then assuming the electrodes A and B to be the same height, the potential of the electrode B will be lower than that of the electrode A or it will be necessary to raise the electrode B above the level of the electrode A to bring the former to the same potential as the latter.

When the potentials of the electrodes A and B have been compared at one point, then the electrode B is moved to another point and a similar comparison made. By moving the electrode B systematically over the area to be prospected, a map of the relative terrestrial potentials prevailing over that area at given points may be obtained.

It has been found that the best results are obtained on clear fine days, since under these conditions the terrestrial potential gradient is uniform over a substantial area in the absence of underlying ore bodies. On generally cloudy days the terrestrial potential gradient is also uniform but is lower than on a clear day. Occasionally atmospheric conditions occur in which the apparatus cannot be satisfactorily operated by reason apparently of an appreciable reduction on the terrestrial potential gradient.

In dry snow conditions in winter the method may be carried out by simply using the two electrodes A and B, omitting the radioactive coating if desired, without the electrode C. The electrode A is placed in the snow at a reference point and the electrode B placed in the snow at a series of points within the area to be surveyed. With the electrode B at each of these points, a direct comparison of the potentials of the electrodes is made by operating the switches as when, in the case described above, the equality of the potentials of A and B is to be checked.

As has been indicated, the method of the invention has been carried out using media other than the atmosphere and snow. Suitable media are those which have a resistance approaching that of country rock. Thus, surface rock formations are suitable but water and damp earth are not. Among surface formations of rock, the potentials may be obtained by means of carbon electrodes mounted in wooden handles thrust against the rock to make contact with it. In some cases the potentials can be obtained by placing the electrodes against overburden but, in general, the electrodes should be both placed on a similar medium in order to eliminate indications caused by galvanic action. In the case of shallow overburden, galvanic action is eliminated between it and adjacent rock during the winter season when all is frozen solid making the rock and the overburden a common medium. When the method is carried out using tree blazes, the two electrodes will be the same as those used for surface rock formation.

It may be helpful to indicate the theory which led the inventor to make the observations referred to at the beginning of this specification, and which appears to be borne out by those observations. It has heretofore been thought that the conducting bodies between which normal fine-weather atmospheric potential exists are the surface of the earth on the one hand, and the ionosphere on the other hand, and that these may be considered to form a leaky condenser. However, it seemed possible to the inventor that the conducting body forming one plate of the condenser (the other plate of which is the ionosphere) is not the entire earth but rather a conducting shell which may be at a considerable depth below the outer surface of the earth; the external crust of the earth, together with the atmosphere up to the ionosphere, constituting the dielectric. It is known that many types of ore are, in comparison to the surrounding rock, relatively good conductors of electricity, e. g. sulphide ore in pre-Cambrian rock, and it was reasoned on the basis of the above-mentioned theory that the presence of an ore body constituting a relatively good electrical conductor in what may be termed the insulating crust of the earth surrounding the conducting shell above-mentioned would result in a lower resistance along radial lines passing from the conducting shell through an ore body to the earth's surface than along radial lines passing through ordinary rock.

The matter may be more fully explained by reference to Figure 4. In that figure, the line 50 represents the outer surface of the earth's conducting shell referred to above; 51 is the surface of the earth and 52 the ionosphere. The theory, as indicated above, is that the leaky condenser across which the terrestrial potential exists has as its normally negative plate not the entire earth, as has been previously assumed, but rather the conducting shell 47, that part 48 of the earth between the surface 50 of this shell and the surface 51 of the earth being the earth's insulating crust 48, and this crust, together with the atmosphere 49 between the earth's surface 51 and the ionosphere 52, constituting the dielectric of the condenser. Through this imperfect dielectric by far the greatest part of the resistance is found in the atmosphere, the resistance of the earth's crust being very small in comparison to it. Consequently, as the resistance of the atmosphere is substantially constant over a given area at a given time, variations in the resistance through the earth's crust over that area will not result in the appreciable variations in the leak back current flowing between the conducting shell and the ionosphere.

An ore body 53 is shown in the earth's crust. The conductivity of the ore body is higher than that of the surounding rock, so that the resistance through the earth's crust 48 in a column 54 (shown as a dotted line) passing from the surface 50 of the conducting shell 47 through the ore body 53 to the surface 51 of the earth is lower than the resistance through a similar column 55 (shown as another dotted line) which does not pass through the ore body. However, the resistance in the atmospheric columns 56 and 57 constituting continuations of the columns 54 and 55 respectively is the same, and is much greater than the resistance in either of the columns 54 or 55. Consequently the difference between the resistance in the total column 54—56 and that in the total column 55—57 is so small a fraction of the total resistance in these columns that the current in these two columns is substantially the same. It thus follows that the terrestrial potential near the surface of the earth in the column 56 should be lower than the terrestrial potential at the same height above the ground in the column 57, or, otherwise expressed, that the equipotential surface in the atmosphere should show a rise above the ore body. This is indicated diagrammatically by the hump 59 in the line 58 indicating an equipotential surface in the atmosphere.

In the case of using the potentials occurring in snow, it seems possible to the inventor that positive ions raining out of the atmosphere accumulate in dry snow upon the earth, and the upward stream of electrons which could be slightly more intense directly over a good conducting body, tend to neutralize locally the accumulation of positive charges in the snow and thus produce the relatively negative charged area of snow found to exist directly over an ore body, even when such ore body is located at a very considerable depth.

The embodiments of the invention in which an exclusive property or privilege is claimed are defined as follows:

1. A method of geophysical prospecting which comprises the steps of arranging at least two electrodes above the ground at laterally spaced apart points in an area to be prospected, determining the relative elevations of said electrodes above the ground, and obtaining an indication of the potentials resulting from terrestrial electricity occurring at a given time at said electrodes.

2. A method according to claim 1 in which an indication of the potentials resulting from terrestrial electricity is obtained by adjusting the height above the ground of one of the electrodes until the potential resulting from terrestrial electricity is the same at each electrode.

3. A method according to claim 1 in which the two electrodes are arranged at substantially the same elevation above the ground, and an indication of the potentials resulting from terrestrial electricity is obtained by taking a measurement of the potential resulting from terrestial electricity at each electrode.

4. A method of geophysical prospecting which comprises the steps of arranging at least two electrodes above the ground in contact with media having resistances substantially the same as that of country rock and at laterally spaced apart points in an area to be prospected, determining the relative elevations of said electrodes above the ground, and obtaining an indication of the potentials resulting from terrestrial electricity occurring at a given time at said electrodes.

5. A method according to claim 4 in which the two electrodes are arranged at substantially the same elevation above the ground, and an indication of the potentials resulting from terrestrial electricity is obtained by taking a measurement of the potential resulting from terrestrial electricity at each electrode.

6. A method according to claim 5 in which the electrodes are arranged in contact with substantially electrically similar surface rock formations.

7. A method according to claim 4 in which the electrodes are arranged in contact with dry snow.

8. A method of geophysical prospecting of an area which comprises the steps of arranging a first electrode above the ground at a point outside said area, arranging a second electrode above the ground at a point inside said area, determining the relative elevations of said electrodes above the ground, obtaining an indication of the potentials resulting from terrestrial electricity at the first and second electrodes at a first given time, moving the second electrode to at least one other point above the ground inside said area, deterimning the relative elevations of said electrodes above the ground, and obtaining an indication of the potentials resulting from terrestrial electricity at the first electrode and at the second electrode at said other point at a second given time.

9. A method according to claim 8 in which each of the steps of obtaining an indication of the potentials resulting from terrestrial electricity is carried out by adjusting the height above the ground of one of the electrodes until the potential resulting from terrestrial electricity is the same at each electrode.

10. A method according to claim 8 in which, each time an indication of the potentials resulting from terrestrial electricity is obtained, the two electrodes are arranged at substantially the same elevation above the ground, and a measurement is taken of the potential resulting from terrestrial electricity at each electrode.

11. A method according to claim 10 in which, each time an indication of the potentials resulting from terrestrial electricity is obtained, the two electrodes are arranged in contact with media having resistances substantially the same as that of country rock.

12. A method according to claim 11 in which the media are surface rock formations.

13. A method according to claim 11 in which the media are areas of dry snow.

14. A method of geophysical prospecting of an area which comprises the steps of placing a first electrode in dry snow upon the earth at a point outside said area, arranging a second electrode in dry snow at a point inside said area, determining the relative elevations of said electrodes above the ground, comparing the potentials resulting from the accumulation of electrically charged atmospheric particles at the first and second electrodes at a first given time, placing the second electrode in dry snow on at least one other point inside said area, determining the relative elevations of said electrodes above the ground, and comparing the potentials resulting from the accumulation of electrically charged atmospheric particles at the first electrode and at the second electrode at said other point at a second given time.

References Cited in the file of this patent

"Exploration Geophysics" by Jakosky, 2nd edition, 1950, pp. 444–456.